Patented Apr. 8, 1952

2,592,454

UNITED STATES PATENT OFFICE 2,592,454

BENZOYLPOLYGLUTAMIC ACID AMIDES AND PREPARATION OF THE SAME

John H. Mowat, Pearl River, and Coy W. Waller, Nanuet, N. Y., assignors to American Cyanamid Company, New York, N. Y., a corporation of Maine No Drawing. Application August 30, 1947, Serial No. 771,570

4 Claims. (Cl. 260—112)

This invention relates to new organic compounds and to process of preparing the same.

In our copending application Serial No. 606,704, filed July 23, 1945, now U. S. Patent 2,500,296 issued March 14, 1950 of which this is a continuation-in-part, we disclosed that certain glutamic acid amides of p-aminobenzoic acid, especially those having a polypeptide linkage, such as p-aminobenzoylglutamylglutamic acid and p-aminobenzoylglutamylglutamylglutamic acid and the salts, esters and amides thereof, are of particular importance in the preparation of new compounds having important biological properties.

As disclosed in our above named copending application, the reaction products of p-aminobenzoylpolyglutamic acids with 2,4,5-triamino-6-hydroxy pyrimidine and alpha,beta-dibromopropionaldehyde are growth stimulating factors for bacteria and higher forms of animal life and affect the formation of haemoglobin. These polypeptides are also of value because of other physiological properties which have not yet been fully defined. Some of the various possible position isomers possess these physiological properties in different degrees, some being much more active than others, particularly in lower forms of animal life. In any event, it is desirable that methods be made available whereby the various isomers may be prepared in good yield at a reasonable cost with certainty as to their chemical constitution and structure. The present application discloses such methods.

Because of the fact that glutamic acid is a dicarboxylic acid, polypeptides thereof may exist in more than one configuration. As shown in our copending application Serial No. 606,704, glutamylglutamic acid may have the alpha form

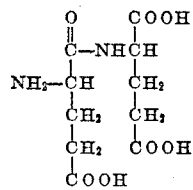

in which the terminal glutamic acid radical is attached to the alpha carbon atom of the first glutamic acid radical. As also shown, glutamylglutamic acid may have the gamma configuration

```
        COOH
NH₂—CH      COOH
     CH₂    CH₂
     CH₂    CH₂
      C—NH—CH
      ‖      COOH
      O
```

When considering polypeptides having three glutamic acid groups, still more position isomers are possible. For example, gamma-glutamyl-gamma-glutamylglutamic acid:

```
     COOH
NH₂—CH
    CH₂
    CH₂    COOH
    N—NH—CH
    ‖      CH₂
    O
           CH₂    COOH
           C—NH—CH
           ‖      CH₂
           O
                  CH₂COOH
```

This compound has a "gamma, gamma" linkage and is one of the preferred products of the present invention. Other possible linkages include that of alpha, gamma-glutamyldiglutamic acid

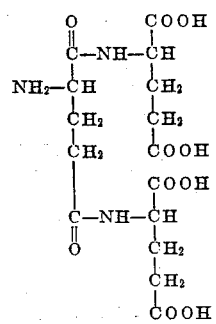

also, alpha - glutamyl-gamma-glutamylglutamic acid:

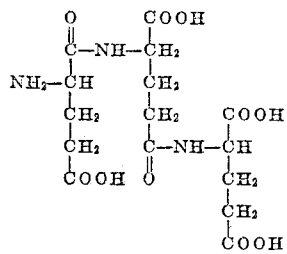

alpha - glutamyl-alpha - glutamylglutamic acid and gamma - glutamyl-alpha - glutamylglutamic acid. In the case of still higher polypeptides the number of possible isomers becomes progressively higher but follows the same general pattern.

Obviously, the preparation of polypeptides of the class described and claimed herein will vary with the type of linkage. In general, compounds having an alpha linkage will be prepared by one method, whereas those having a gamma linkage, such as "alpha, gamma," may be prepared by combination of procedures, as will be described hereinafter. It will also be shown that there are alternative procedures available to prepare the individual isomers.

A preferred method of preparing compounds having an alpha linkage is shown in our above named copending application in the first part of Example 16. According to that procedure, p-nitrobenzoylglutamic acid is transformed into an anhydride, or azlactone, which when reacted with glutamic acid or a salt, ester, or amide thereof will result in substitution of the p-nitrobenzoyl-glutamic acid, forming principally the dipeptide, p - nitrobenzoyl - alpha - glutamylglutamic acid ester. Simple hydrolysis in alkaline solution removes the ester group. The exact details of the procedure are as follows:

*Example 1*

A mixture of 5 parts by weight of p-nitro-benzoylglutamic acid and 15 parts by volume of acetic anhydride was heated at 100° C. for 5 minutes. The solution was then cooled, filtered, and evaporated to dryness in vacuo. The residue was then crystallized from chloroform and the crystalline product, p-nitrobenzoylglutamic anhydride, was then twice recrystallized from acetone and petroleum ether.

Glutamic acid was esterified in absolute alcohol containing dry hydrogen chloride by the procedure of Fisher (Ber. 34, 453 (1901)).

A solution of 2.68 parts of diethylglutamate in 10 parts by volume of dry chloroform was treated with 1.7 parts of p-nitrobenzoylglutamic anhydride. After standing at room temperature for ten hours the solution was extracted with dilute hydrochloric acid to remove excess diethylglutamate, and the chloroform solution was then evaporated to dryness in vacuo. The residue was dissolved in 32.5 parts by volume of 1. N sodium hydroxide solution, and, after 1 hour at room temperature, the calculated amount of 6 N hydrochloric acid was added. The solution was treated with charcoal, filtered, and evaporated to dryness. The residue was extremely hygroscopic and could not be crystallized, but the barium salt of the product, p-nitrobenzoyl-alphaglutamyl-glutamic acid, was prepared, precipitated, and analyzed satisfactorily.

The nitro compound described above may be converted to the corresponding amino compound by reduction in accordance with the following procedure.

*Example 2*

A solution of 0.5 part by weight of the crude p-nitrobenzoyl-alphaglutamylglutamic acid in 1.5 parts by volume of water and 0.5 part by volume of ammonium hydroxide was added to a hot solution of 2.3 parts of ferrous sulfate heptahydrate in 6 parts by volume of water. Then 2.1 parts by volume of 28% ammonium hydroxide was added in several portions with heating and stirring. After separating the ferric hydroxide, the solution was evaporated to a small volume and treated with 10 volumes of ethyl alcohol. The precipitated ammonium sulfate was separated and the alcoholic filtrate was evaporated to dryness. The residue was taken up in 5 parts of water and acidified to a pH of 2 to 3 with hydrochloric acid and then evaporated to dryness in vacuo. The residue was then extracted with dry isopropanol, and the isopropanol solution was again evaporated to dryness. The crude product contained 89.3% of p-aminobenzoyl-alpha-glutamylglutamic acid.

*Example 3* p-Nitro- and p-aminobenzoyl-alpha-glutamyl-alpha-glutamylglutamic acids may be prepared by the same methods described above using in place of di-ethylglutamate an equivalent amount of alpha-glutamylglutamic acid or one of its salts, esters or amides. When gamma-glutamylglutamic acid is used, the final product will have an alpha-glutamyl-gamma-glutamyl configuration.

*Example 4*

A solution of diethyl glutamate (33.5 g.) of 210 cc. of dry chlorofrom was treated with 41.7 g. of p-nitrobenzoyl glutamic acid anhydride at room temperature. The solution was then allowed to stand at room temperature for about 10 hours. The solution was then filtered and extracted twice with 50 cc. portions of about 1.2 N hydrochloric acid and then with 75 cc. of water. After drying the chloroform solution over magnesium sulphate, it was filtered and evaporated to dryness in vacuo. The viscous syrup was then dissolved in 600 cc. of 1 N sodium hydroxide to remove the ester groups and allowed to stand at room temperature for 1.5 hours. After acidification with the calculated amount of hydrochloric acid, the solution was evaporated to dryness in vacuo. The dry residue was then extracted with about 1 liter of dry acetone and filtered to remove the insoluble sodium chloride. The acetone solution was evaporated to dryness in vacuo, giving a voluminous, non-crystalline, hygroscopic residue. Wt. 62.25 g.

After 4 crystallizations from water the material melted at 144°–147° C. corrected, and a mixed melting point with p-nitrobenzoyl-alpha-glutamylglutamic acid obtained by another method showed no depression of the melting point.

*Example 5*

A portion of the above crude, non-crystalline nitro compound was reduced to the corresponding p-aminobenzoyl - alpha - glutamylglutamic acid with ammonia and ferrous sulphate.

*Example 6*

As indicated above, preferred compounds of the present invention are those in which the amino acids are connected by a peptide linkage at the gamma position. These compounds may be prepared by the processes indicated in the last half of Example 16 of our aforementioned copending application. As stated there, p-nitrobenzoyl-gamma-glutamylglutamic acid may be prepared by first reacting the anhydride of p-nitrobenzoyl-glutamic acid with an equivalent amount of an alcohol to form the alpha ester. An acid chloride is then obtained by reaction with phosphorus pentachloride. Reaction of the acid chloride with glutamic acid yields a polypeptide having the desired configuration. Hydrolysis of the alpha ester group and reduction of the nitro group yields the desired p-aminobenzoyl-gamma-glutamylglutamic acid. Of course, the salts, esters or amides of the acid may be used.

The p-nitro- and p-aminobenzoyl-gamma-glutamyl-gamma-glutamylglutamic acids may be prepared by using gamma-glutamylglutamic acid in the above described reaction instead of glutamic acid. Likewise, the polypeptide having the gamma-glutamyl-alpha-glutamylglutamic acid configuration may be prepared by using alpha-glutamylglutamic acid.

A method of preparing polyglutamic acid amides of p-nitrobenzoic acid having either an alpha or a gamma linkage is to react a p-nitrobenzoyl halide with a polypeptide of glutamic acid having the desired configuration. The following examples disclose such reactions:

*Example 7*

A solution containing 36 parts by weight of diethyl-iso-glutaminyl glutamate sesquihydrate, 70 parts of water, and 180 parts of 2 N sodium hydroxide solution was treated with 36 parts of p-nitrobenzoyl chloride simultaneously with 180 parts of 2 N sodium hydroxide solution during a period of about five to ten minutes. After stirring for an additional thirty minutes the mixture was filtered and the filtrate was acidified to about pH 2. The precipitated p-nitrobenzoic acid was filtered off, and the filtrate on cooling deposited white crystals which on recrystallization from hot water had a melting point of 199°–201° C. uncorrected. The product had the formula:

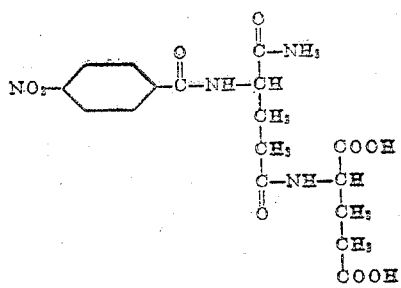

*Example 8*

The amide group

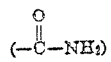

of the above compound was converted to a carboxy group as follows:

A portion of the p-nitrobenzoyl isoglutaminyl-glutamic acid prepared as described above was dissolved in 1 N NaOH solution and warmed gently for a few minutes and then allowed to stand at room temperature for one hour. The solution was then acidified to pH 2.0 with hydrochloric acid. The precipitate which was formed was cooled, washed in water, and dried. It had a melting point of 185.0°–186.5° C. uncorrected. When mixed with a sample of p-nitrobenzoyl-gamma-glutamylglutamic acid prepared by a different method there was no depression of the melting point.

*Example 9*

To a well-stirred solution of alpha-glutamyl-glutamic acid (35 g.), water (300 cc.) and sodium hydroxide (17.75 g.) was added 45.8 g. of p-nitrobenzoyl chloride and 210 cc. of 2 N sodium hydroxide solution during a period of about 20 minutes. After stirring for one hour the mixture was cooled and filtered. The filtrate was then acidified with 105 cc. of 6 N hydrochloric acid and thoroughly cooled. The crystalline precipitate was collected, washed with cold water and then extracted with several portions of hot water (400 cc. in all). The combined aqueous extracts were filtered while hot and then cooled for several hours in the icebox. The crystalline precipitate of p-nitrobenzoyl-alpha-glutamyl-glutamic acid was collected, washed with water and dried. Wt. 40 g. (76%).

After recrystallization from hot water, the product p-nitrobenzoyl-alpha-glutamylglutamic acid was analyzed and found to check very closely with the theoretical values for carbon, hydrogen, and nitrogen. The product had a corrected melting point of 146.5°–148.5° C. A 4% solution in acetone had an optical rotation of $[\alpha]_D^{29} = +8.12°$.

*Example 10*

The above nitro compound was reduced by the following procedure:

A mixture of p-nitrobenzoyl-alpha-glutamyl-glutamic acid (15 g.), glacial acetic acid (60 cc.), water (325 cc.), and platinum oxide catalyst (0.3 g.) was shaken with hydrogen at room temperature and atmospheric pressure until about the required amount of hydrogen was absorbed. The mixture was then filtered. A sample of the filtrate when tested by the Bratton and Marshall method was found to contain 94% of aromatic amine, calculated as p-aminobenzoyl-alpha-glutamyl glutamic acid.

*Example 11*

The following example will describe the preparation of tetraethyl p-nitrobenzoyl-gamma-glutamyl-gamma-glutamyl glutamate. Inasmuch as one of the starting materials, tetraethyl-gamma-glutamyl-gamma-glutamyl glutamate hydrochloride appears to be new, the description will start from known compounds.

78.0 grams of alpha-ethyl carbobenzoxyglutamate was dissolved in 250 cc. of dry ether and cooled to −10° C. 67.8 grams of phosphorous pentachloride was added in portions with stirring over twenty minutes not allowing the temperature to rise over −5° C. The mixture was then stirred thirty-five minutes at −5° to 0° C., filtered and concentrated in vacuo to a residual syrup, keeping the temperature below 0° C. This residue was washed four times by decantation with cold, dry heptane and was then dissolved in 250 cc. cold, dry chloroform and put in a Dry-Ice bath. It was then mixed with 114.0 grams diethyl glutamate in 250 cc. chloroform which had been cooled in a Dry-Ice bath. The solution was allowed to stand at room temperature 2.5 hours and was then shaken out with 200 cc. each time of the following: five times with 0.2 N hydrochloric acid, five times with 0.1 N hydrochloric acid, two times with 0.2 N sodium bicarbonate, one time with 0.1 N hydrochloric acid, and two times with water. The CHCl₃ solution was dried overnight over MgSO₄ and evaporated to dryness in vacuum.

The residual oil changes over to a hard waxlike material.

65 grams of crude triethyl carbobenzoxy-gamma-glutamylglutamate was dissolved in 435 cc. alcohol, treated with Norite, and filtered. 217 cc. water, 17 cc. acetic acid, and 2.6 grams of 10% palladium charcoal catalyst was added. A stream of hydrogen was passed through, and $CO_2$ was evolved. After two hours another portion of 2.6 g. palladium charcoal catalyst was added and reduced one hour. The $CO_2$ was no longer being evolved so the catalyst was filtered out, and the solution concentrated to dryness. The residue was dissolved in 100 cc. dry $CHCl_3$ and HCl gas was bubbled through the solution for twenty to thirty minutes. 650 cc. dry ether was added which precipitated an oil. This oil slowly crystallized and was filtered off and dried.

Upon repeated crystallizations from ethyl acetate or chloroform-ether, a constant M. P. is reached at 129–130° C.

$[\alpha]_D^{26} = -5.6$ (4% solution in water)

25 grams triethyl-gamma-glutamyl glutamate hydrochloride was dissolved in 100 cc. $CHCl_3$ and 1.448 grams sodium dissolved in 50 cc. ethanol was added. A colloidal precipitate of NaCl formed. The mixture was concentrated to dryness in vacuum and more $CHCl_3$ was added and again concentrated to dryness in vacuum. This treatment was repeated once more, and then the residue was suspended in 30 cc. $CHCl_3$ and kept cold until ready for use.

10 grams alpha-ethyl carbobenzoxy glutamate was dissolved in 30 cc. dry ether and cooled to $-10°$ C. 8.7 grams $PCl_5$ was added in portions over fifteen to twenty minutes with stirring and exclusion of moisture. The solution was stirred twenty to twenty-five minutes more and filtered. It was then concentrated to dryness in vacuo, keeping cold. The residue was washed four times with 25 cc. portions of cold, dry heptane. The residue was then dissolved in 30 cc. cold dry $CHCl_3$ and mixed with the $CHCl_3$ solution of triethyl-gamma-glutamylglutamate prepared in the preceding paragraph. The solutions were mixed at Dry Ice bath temperature and kept at room temperature for 2.5–3 hours. It was then shaken out with 25 cc. portions of the following: 4 of 0.2 N HCl, 4 of 0.1 N HCl, 2 of 0.1 N $NaHCO_3$, 1 of 0.1 N HCl, and 2 of water. It was dried over $MgSO_4$ and concentrated to dryness. The solid residue was shaken with ether and filtered off.

11.32 grams tetraethyl carbobenzoxy-gamma-glutamyl-gamma-glutamyl glutamate as prepared above was dissolved in 125 cc. alcohol, 40 cc. water, and 4 cc. acetic acid. 0.4 gram 10% palladium charcoal catalyst was added, and hydrogen was bubbled through. The $CO_2$ evolved was collected as $BaCO_3$. After two hours, 0.4 gram more palladium charcoal catalyst was added. The reduction was finished after five hours.

The catalyst was filtered out, and the solution was concentrated to 40 cc. and diluted with 75 cc. water. A white flocculent precipitate was filtered off, and the water solution concentrated to dryness. The oily residue was dried over $P_2O_5$ and dissolved in 30 cc. $CHCl_3$. HCl gas was passed in to form the hydrochloride, and the product was precipitated by adding 150 cc. ether. The product was filtered off and dried.

5.32 grams of tetraethyl-gamma-glutamyl-gamma-glutamylglutamate hydrochloride from the above preparation was stirred with 50 cc. of dry benzene and 1.94 cc. of diethylamine. The diethylamine hydrochloride was filtered off and washed with benzene. To the filtrate was added 3.96 grams of p-nitrobenzoyl chloride in 50 cc. benzene and 15 cc. of ether. The solution set to a jelly like solid in a few minutes and was shaken well for thirty minutes. It was diluted with dry ether, and the product filtered off and washed five times with ether. After drying, the product was ground up in water and again filtered and dried. It had a melting point of 167–169° C. On recrystallization from hot alcohol the melting point was raised to 170–171° C. Analysis of carbon, hydrogen, and nitrogen checked very well with the theoretical values for tetraethyl-p-nitrobenzoyl-gamma-glutamyl-gamma-glutamyl glutamate.

*Example 12*

100 milligrams of the above nitro compound was reduced to the corresponding amino derivative by stirring with 2 cc. of ethyl alcohol, 2 cc. of water, 0.1 cc. of concentrated hydrochloric acid, and 100 milligrams of iron powder for seventy-five minutes. The excess iron was then removed by filtration and washed with ½ cc. of acetic acid and 3 cc. of water. Analysis of the filtrate showed that it contained 97% of theory of the amine.

*Example 13*

A quantity of alpha-gamma-glutamyldiglutamic acid tetraethyl ester acetate (28.9 parts by weight) was suspended in 35 parts by weight of dry ether and treated with 7 parts by weight of diethyl amine. The ether solution was decanted from the precipitated diethyl amine acetate and treated with an ether solution of 9.3 parts of p-nitrobenzoyl chloride. After standing at room temperature for thirty minutes the precipitate was cooled, washed with ether and water, and dried at 56° C. in vacuo. When recrystallized from hot 25% alcohol, the product appeared to have a melting point of about 142–143° C., but the rate of heating seemed to affect the melting point. Analyses for carbon, hydrogen, and nitrogen checked very well with the calculated values for p-nitrobenzoyl-alpha,gamma-glutamyldiglutamic acid tetraethyl ester, the compound having the following formula:

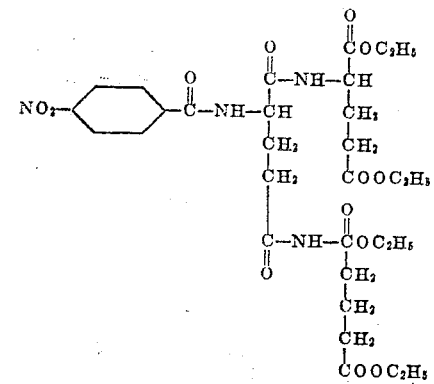

*Example 14*

The above nitro compound was reduced to the corresponding amino compound by stirring a mixture of 6.6 parts thereof with 156 parts by weight of ethanol, 100 parts by weight of water, 3.32 parts by weight of iron, 2.5 parts of concentrated hydrochloric acid and 0.03 parts of mercuric chloride. After four and one-half hours at 50° C. the Bratton-Marshall test indicated that the reduction was 95% complete.

The above mixture was filtered, and the filtrate was adjusted to pH 8.2 by the addition of sodium hydroxide. The precipitated iron hydroxide was removed by filtration and washed with ethyl alcohol. The combined filtrate and washings were acidified to a pH of 6.5 and evaporated to dryness in vacuo. The residue was suspended in a little water, collected on the filter, washed with water, and dried. On recrystallization from 25% ethyl alcohol it had a melting point of 145°–148° C. uncorrected. Analyses for carbon, hydrogen, and nitrogen checked well with the theoretical values for p-aminobenzoyl-alpha,gamma-glutamyldiglutamic acid tetraethyl ester.

Example 15

The following example describes the preparation of p-nitrobenzoyl-alpha-glutamyl-alpha-glutamylglutamic acid triethyl ester. In this reaction p-nitrobenzoyl chloride is reacted with the triethyl ester of alpha-glutamyl-alpha-glutamylglutamic acid. Inasmuch as the latter compound appears to be new, a detailed description of it from known compounds is included.

130 grams of gamma-ethylglutamate was warmed up with 64 grams of sodium bicarbonate in 500 ml. of water and filtered. To this was added over a period of 10 minutes 131 grams of carbobenzoxy glutamic acid anhydride. The temperature was held at 29° to 30° C. and the pH at 8.75. The solution was stirred and held at pH of 8.75 for 30 minutes more. This was then diluted to 3,000 ml. with water. To this concentrated hydrochloric acid was added dropwise to a pH of 3.5. Temperature 33° C. At this point a small amount of oily material started to come out. This was set in the refrigerator overnight. The crystalline material was filtered off.

A portion of the above crude carbobenzoxy-alpha-glutamyl-gamma-ethylglutamate was recrystallized from water. 40 grams of this material was added to 800 ml. of water heated to 90° C. This was filtered, and the filtrate cooled to 60° C. A crystalline material had settled out. This was filtered off and dried. M. P. 157°–158° C.

100 grams of carbobenzoxy-alpha-glutamyl-gamma-ethylglutamate was added to 1000 ml. of 2B alcohol containing 42 grams of p-toluene sulfonic acid monohydrate. This was allowed to stand at room temperature for 2 days. The crystalline material was filtered off. Wt. 95 grams, M. P. 104°–106° C. When the filtrate was cooled further, 7 more grams of material was obtained.

The M. P., 104°–106° C., checks with that for carbobenzoxy-alpha-glutamyl glutamic acid triethyl ester prepared by another method.

49.4 grams of carbobenzoxy-alpha-glutamyl-glutamic acid triethyl ester was dissolved in 1000 ml. of 2B alcohol containing 19 grams of p-toluene sulfonic acid monohydrate. Then 2.5 grams of 10% palladium charcoal catalyst was added. $H_2$ was bubbled in. In 1 hour and 20 minutes the reduction was complete.

The reduction mixture described above was filtered, and the filtrate concentrated to a syrup under reduced pressure. The syrup was washed with petroleum ether and residue again subjected to reduced pressure to remove solvents. The residue was made up to 125 ml. with water and adjusted to pH 8.5. To this was added 28.9 grams of carbobenzoxy glutamic acid anhydride. Temperature was held at 15 to 20° C., and the pH was held at 8.5. This was then diluted to 400 ml. and made acid. A gummy precipitate came down. The mixture was heated to 60° C., and the water phase poured off. The oily layer was then mixed with 400 ml. of water and heated to 90° C. Most of the water phase was drawn off, and the rest poured into a graduate. Volume, 30 ml. This was disssolved in 170 ml. of 2B alcohol and chilled in the refrigerator. A white crystalline material was filtered off. Wt., 12.5 grams. M. P., 143–144° C. Part of this was recrystallized from alcohol. 2.5 grams of the above was heated with 35 ml. of 2B alcohol until it went into solution. This was cooled to 55° C. and filtered. The filtrate was set in the refrigerator for two hours. A white crystalline material was filtered off, washed with cold alcohol, and cold ether. M. P. 146° C.

156 grams of carbobenxozy-alpha-glutamyl-alpha-glutamyl glutamic acid triethyl ester as prepared above was warmed up to 60° C. in 1500 ml. of 2B alcohol containing 26.3 grams of p-toluene sulfonic acid. This was held at this temperature for two hours and then allowed to stand over night at room temperature. The tetraethyl ester resulting was warmed up to 50° C., and 5 grams of palladium catalyst (10% on charcoal) was added. Hydrogen was bubbled in. At 2 hours the reduction was complete. The catalyst was filtered off, and the solvents removed under reduced pressure. Towards the end a little toluene was added. (To assist in removal of water.) This was repeated three times.

To the residue 600 ml. of water, 100 grams of sodium bicarbonate, and 500 ml. of chloroform (chloroform was used because the product is soluble in this solvent), and 58 grams of p-nitrobenzoyl chloride were added with stirring. The temperature was about 18° C. This was then warmed up to 38° C. and stirred for ¾ hour. The chloroform phase was drawn off, washed with a little sodium bicarbonate solution, and filtered. The chloroform was removed under reduced pressure. The residue was dissolved in 1000 ml. of 3A alcohol and set in the refrigerator over night. 169 grams of air dried material were filtered off. The whole batch was dissolved in 1000 ml. of warm 3A alcohol and filtered. To the filtrate 1000 ml. of water was added. A white crystalline material settled out. The M. P. was essentially the same as the original. This material was then dissolved in 1000 ml. of ethyl acetate. 300 ml. of water was added and sodium bicarbonate added in excess of solubility. This was then stirred vigorously and heated to 70° C. The water phase was drawn off, and the ethyl acetate phase reduced to a solid phase under reduced pressure distillation. The residue was dissolved in 1000 ml. of warm alcohol and filtered. The filtrate was cooled in ice bath. 113 grams of p-nitrobenzoyl-alpha,alpha-diglutamylglutamic acid tetracethyl ester, a white material, was filtered off. This fused at 115° C. (when the filtrate was cooled over night at −7° C.), 7½ grams more was obtained. This fused at 114° C. This compound, as well as some of the others described herein, exhibits polymorphism, one form thereof having a melting point at 144° C. when prepared by another method.

Example 16

The above nitro compound was reduced to p - aminobenzoyl - alpha,alpha - diglutamyl glutamic acid tetraethyl ester by the following procedure:

99 grams of the p-nitrobenzoyl triglutamic acid tetraethyl ester was added to a solution of 400 ml. of glacial acetic acid and 600 ml. of water. Temperature about 33° C. 58 grams of zinc-copper dust was weighed out. When part of this was added, the zinc-copper seemed to conglomerate. Therefore, the temperature was raised to 40° C. This did not seem to help. Therefore, 250 ml. of ethanol was added, and the temperature raised to 45° C. The rest of the zinc-copper was added, plus 10 more grams. The mixture was stirred 10 minutes longer and filtered. The filtrate was diluted to 2500 ml. with water, cooled, and filtered. The precipitate was dissolved in 750 ml. of alcohol, and 750 ml. of water added. This was cooled and filtered. This material had an M. P. of about 141° C., and a light brownish color, indicating that it was not a pure compound. Many recrystallizations from alcohol and alcohol-water did not improve the material. All of these attempts at purification caused a great loss of material. Finally, 30 grams of material left, the material was added to a solution of 1000 ml. of water and 100 ml. of acetic acid heated to 90° C. This solution was filtered hot. The coloring material was filtered off. Upon cooling, an almost white precipitate came down. This was filtered off. Wt. 17 grams. This had an M. P. of 148° C. The analyses checked closely with theoretical values.

*Example 17*

In the reaction between alpha-glutamylglutamic acid triethyl ester and carbobenzoxy glutamic acid anhydride, as described in Example 15, the major reaction product is carbobenzoxy alpha - glutamyl - alpha - glutamylglutamic acid triethyl ester. However, some carbobenzoxy gamma-glutamyl-alpha-glutamylglutamic acid triethyl ester is formed. This is a more soluble material than the principal product, but may be recovered from the solution after removal of the alpha-alpha product and purified by crystallization from alcohol. After decarbobenzoxylation and para-nitro benzoylation in the manner described in Example 15 the resulting product, para - nitrobenzoyl-gamma-glutamyl-alpha-glutamylglutamic acid triethyl ester has a melting point after recrystallization twice from alcohol of 185°–186° C. The analysis of the product checked with the theoretical values, and a mixed melting point determination made with the same compound prepared by another method showed no depression of melting point.

*Example 18*

A quantity of the para-toluene sulfonic acid salt of alpha-glutamyl-gamma-glutamylglutamic acid tetraethyl ester was dissolved in 125 ml. of water. To this was added 25 grams of NaHCO₃ and 22 grams of p-nitrobenzoyl chloride in 100 ml. of chloroform. This was stirred vigorously for one hour at room temperature. The temperature was then raised to 40° C. and stirred for twenty minutes more. The chloroform phase was drawn off and concentrated to a syrup. To this 250 ml. of 2B alcohol was added. About 5 grams of p-toluene sulfonic acid was added and heated to 50° to 60° C. (to make sure that the compound was completely esterified). This was set in a refrigerator over night. A white crystalline material was settled out. Wt. 22 grams. Melting point, softened at 135° C., melted at 144° C. This was recrystallized twice from 2B alcohol. Melting point 154° C.

In the above examples p-aminobenzoylpoly-glutamic acids and esters were prepared by the reduction of the corresponding nitro compound. It is not necessary, however, that the amino derivatives be prepared in this way. Other groups which may be converted to an amino group by hydrolysis, reduction or otherwise may be prepared, and these compounds then converted to the aminobenzoylpolyglutamic acids in known manner. The following examples are directed to certain of these compounds.

*Example 19*

5 grams of triethyl p-aminobenzoyl-gamma-glutamylglutamate, was suspended in 50 cc. of water and 3.5 cc. of concentrated HCl. The resulting hydrochloride was not completely dissolved. This was cooled to 0° C. in an ice-salt bath, and the diazonium derivative formed by adding slowly a solution of 0.75 g. of sodium nitrite in 5 cc. of water to the well stirred mixture. After thirty minutes stirring this was added to a well stirred solution of 1.0 g. of phenol and 4.0 g. of Na₂CO₃ in 150 cc. of water. A red gummy solid appeared which solidified quite quickly. After cooling this was filtered, washed with water and dried; yield 5.8 g.

This material was dissolved in 50 cc. of a hot solution of 50% ethanol-50% water. It was Norited, filtered and cooled. It oiled out and then solidified in crystalline form; yield 4.6 g. of orange solid. This was recrystallized from 35 cc. of ethyl acetate, and the product, triethyl p - (p - hydroxyphenylazo) - benzoyl - gamma-glutamylglutamate, crystallized again from ethyl acetate. It crystallized in long, needle-like crystals, orange in color; yield 2.4 g.; M. P. 143°–144° C.

This product may also be prepared by reacting p-(p-hydroxyphenylazo)-benzoyl chloride with gamma-glutamylglutamic acid, or an ester thereof, in the presence of an acid binding substance as in the preceding examples. Treating the product with a reducing agent, such as sodium hydrosulphite or stannous chloride converts the azo group to an amino group.

*Example 20*

1.5 g. of p-aminobenzoyl-gamma-glutamylglutamic acid triethyl ester was dissolved in 20 cc. of reagent acetone and 1 cc. of acetic anhydride was added. This was refluxed for one hour and placed in the refrigerator overnight. The product was filtered, washed with acetone and ether and dried; yield 1.0 g.; M. P. 163°–165° C. This material was dissolved in 8 cc. of ethanol and when cooled, the product, p-(acetyl-amino)-benzoyl-gamma-glutamylglutamic acid triethyl ester, jelled out. It was filtered and dried and then recrystallized from 10 cc. of dioxane; fine hairlike needles (white); yield 0.6 g.; M. P. 165°–166° C.

$[\alpha]_D^{27°} = -22.5°$ (2% solution in ethanol)

The above product may also be prepared by reacting p-acetylaminobenzoyl chloride with gamma-glutamylglutamic acid triethyl ester in the presence of an alkaline substance. Treating the product with a hydrolyzing agent converts the acylamino radical to an amino radical.

*Example 21*

2.0 g. of p-aminobenzoyl-gamma-glutamylglutamic acid triethyl ester was dissolved in 40 cc. of acetone and 10 cc. of water was added. Then 0.35 g. of NaHCO₃ and 0.7 cc. of carbobenzoxy chloride was added and the solution shaken for 10 minutes. Another 0.35 g. of $NaHCO_3$ and 0.7 cc. of carbobenzoxy chloride were added, and the solution shaken occasionally for 30 minutes. 150 cc. of water was then added and a crystalline precipitate appeared. After cooling, this was filtered, washed with water and ether and dried; yield 2.45 g. (95%). This was recrystallized once from 140 cc. of a solution of one part ethanol and one part water. The product, p-(carbobenzoxyamino)-benzoyl - gamma-glutamylglutamic acid triethyl ester, was crystallized again from ethanol. It crystallized in white needles; yield 1.4 g.; M. P. 151°–152° C.

$[\alpha]_D^{27°} = -18.5°$ C. (2% solution in ethanol)

Example 22

2.0 g. of p-aminobenzoyl-alpha-glutamylglutamic acid triethyl ester was dissolved in 25 cc. of reagent acetone and 1.5 cc. of acetic anhydride was added. This was refluxed for one hour and then cooled for several hours. The product, p - (acetylamino) - benzoyl - alpha-glutamylglutamic acid triethyl ester, crystallized out; yield 1.7 g. This was recrystallized once from 70 cc. ethyl acetate and once from 20 cc. of ethanol; thin hairlike needles (white); yield 1 g.; M. P. 174°–176° C.

$[\alpha]_D^{28°} = -6.75°$ (2% solution in ethanol)

Example 23

2.0 g. of p-aminobenzoyl-alpha-glutamylglutamic acid triethyl ester was dissolved in 40 cc. of acetone and 10 cc. of water added. To this was added 0.35 g. of $NaHCO_3$ and 0.7 cc. of carbobenzoxy chloride, and the mixture was shaken for 10 minutes. Then another 0.35 g. of $NaHCO_3$ and 0.7 cc. of carbobenzoxy chloride was added, and the solution stood 30 minutes with occasional shaking. About 150 cc. of water was added and the product, p-(carbobenzoxyamino)-benzoyl-alpha-glutamylglutamic acid triethyl ester, oiled out but solidified and crystallized quite quickly upon cooling. After cooling overnight it was filtered, washed and dried; yield 2.5 g. (97%). This was recrystallized once from 25 cc. of ethyl acetate and once from 20 cc. of ethanol; long thin, rectangular prisms (white); yield 1.8 g.; M. P. 134°–135° C.

$[\alpha]_D^{27°} = -5.0°$ (2% solution in ethanol)

Example 24

1.0 g. of crude p-aminobenzoyl-gamma-glutamyl-gamma-glutamylglutamic acid tetraethyl ester was suspended and partially dissolved in about 35 cc. of reagent acetone. 0.5 cc. of acetic anhydride was added, and the solution refluxed for one hour. After standing in the refrigerator several days the product, p-(acetylamino)-benzoyl - gamma - glutamyl - gamma - glutamylglutamic acid tetraethyl ester, was filtered off and dried; yield 0.5 g. This was then crystallized from 8 cc. of ethanol. It tended to gel. However, by warming and cooling repeatedly it changed to a crystalline product. This was crystallized again in the same manner; yield 180 mgs.; M. P. 179°–183° C.

Example 25

3.0 g. of p-aminobenzoyl-gamma-glutamyl-gamma-glutamylglutamic acid tetraethyl ester was dissolved in 50 cc. of acetone and 10 cc. of water was added. Then 0.4 g. of $NaHCO_3$ and 0.8 cc. of carbobenzoxy chloride were added, and the solution shaken for 10 minutes. Another 0.4 g. of $NaHCO_3$ and 0.8 cc. of carbobenzoxy chloride was then added, and the solution stood for 30 minutes with occasional shaking. About 140 cc. of water was added, and the product, p-(carbobenzoxyamino) - benzoyl - gamma - glutamyl - gamma-glutamyl glutamic acid tetraethyl ester, oiled but quickly solidified. This was cooled 3 hours, then filtered, washed and dried; yield 3.5 g. This was crystallized from 15 cc. of dioxane, and the product recrystallized from 35 cc. of ethanol. Upon cooling the ethanol the product tended to gel so that warming and cooling was necessary to cause crystallization. It crystallized in white needles; yield 2.0 g.; M. P. 146°–148° C.

$[\alpha]_D^{27°} = -23.8°$ (2% solution in ethanol)

Example 26

20 g. of gamma-ethyl-p-nitrobenzoyl-gamma-glutamylglutamic acid was suspended in 190 cc. of water and 20 cc. of ethanol and reduced with 17 g. of zinc dust containing 3% copper. HCl was used to maintain a pH of 3.5. After reducing for about one hour the excess zinc was filtered off, $NH_4OH$ added until the filtrate was distinctly alkaline and $H_2S$ passed in for 30–40 minutes. The ZnS was filtered off, and the filtrate brought to pH 3 and evaporated to dryness using a high vacuum pump and a dry ice trap. Ethanol was added and evaporated again. Then the solid was taken up in about 80 cc. of absolute ethanol, filtered to remove $NH_4Cl$, and the filtrate evaporated to dryness to give a flaky solid; yield—17.4 g. A Bratton-Marshall amine test showed this to be 88% pure. This represents an 84% yield of amine.

This material was then dissolved in 110 cc. of dried absolute ethanol containing .1 g. HCl/cc. by warming to 50–60° C. This stood at room temperature overnight during which time a gelatinous precipitate appeared. It was then cooled several hours, filtered, washed and dried; yield 15.8 g.; M. P. 182–184° C. This was the hydrochloride of the fully esterified product in fairly pure condition.

This product was suspended in 150 cc. of water and warmed to 60–70° C. 10 cc. of pyridine was added, and the mixture well shaken. The hydrochloride dissolved, and the free amine came out crystalline; yield 13.7 g.; M. P. 128–130° C. This was fairly pure and represented a 65% yield from the nitro compound.

2.5 g. of this material, p-aminobenzoyl-gamma-glutamylglutamic acid triethyl ester, was recrystallized from 15–20 cc. of ethanol; yield 1.8 g.; M. P. 129–131° C. (U. S. P. method).

$[\alpha]_D^{28°} = -20.3°$ (2% solution in ethanol)

Example 27

15.0 g. of gamma-ethyl-p-nitrobenzoyl-gamma-glutamyl-amma-glutamylglutamic acid, was suspended in 150 cc. of water and reduced with 10 g. of zinc dust as described above. After the final evaporation the yield of flaky solid was 11.4 g.

This material was esterified as described above using 60 cc. of dried absolute ethanol containing .1 g. HCl/cc. This product was also gelatinous; yield 9.7 g. This was suspended in 70–80 cc. of water, warmed to about 60° C. and 3.5 cc. of pyridine added. The hydrochloride dissolved, and the p-aminobenzoyl-gamma - glutamyl - gamma-glutamylglutamic acid tetraethyl ester came out as an oil which solidified upon cooling. It was filtered, washed with water and ether and dried; yield 7.0 g. It was then recrystallized from 20 cc.

of absolute ethanol. It crystallized in small triangular platelets; yield 5.7 g.; M. P. 144–146° C. (U. S. P. method).

$[\alpha]_D^{26°} = -27.2°$ (4% solution in ethanol)

*Example 28*

27.8 g. (dry weight) of p-nitrobenzoyl-alpha-glutamylglutamic acid was suspended in 150 cc. of water and reduced with 22 g. of zinc dust. Some ice was added to keep it cool during the reduction. This was worked up as in the two previous examples to give 21.6 g. of a flaky solid which was 91% amine by a Bratton-Marshall.

This was esterified by dissolving in 140 cc. of dry absolute ethanol containing .1 g. HCl/cc. of solution. This stood at room temperature for 8 hours during which time a crystalline solid appeared. After cooling overnight it was filtered, washed and dried; yield 16.9 g.; M. P. 164–167° C. This was recrystallized and Norited from about 140 cc. of ethanol. It crystallized in hair-like needles; yield 12.6 g.; M. P. 166–168° C.

12 g. of this hydrochloride was suspended in 120 cc. of water, warmed to 60° C. and 8 cc. of pyridine added. The free amine, p-aminobenzoyl-alpha-glutamylglutamic acid triethyl ester, oiled out but solidified and crystallized upon cooling; yield 10.7 g.; M. P. 113–115° C. This was recrystallized and Norited from 75 cc. of ethanol; yield 6.8 g.; M. P. 114–115° C.

$[\alpha]_D^{28°} = -8.75°$ (2% solution in ethanol)

The new products of the present invention are generally characterized as being white solids having a melting point within the range of about 130° to 200° C. It is difficult to generalize concerning the solubility characteristics, but for the most part the esters are generally insoluble in water whereas the free acids are water soluble. They are also soluble in organic solvents, as will be apparent from the previous example in which different solvents were used in the purification procedures. The preferred procedure in which a benzoyl halide is reacted with the desired polyglutamic acid, salt, ester or amide is preferably conducted under anhydrous conditions using a solvent such as ether, benzene, chloroform or the like, with an alkaline substance such as diethyl amine to take up the acid which is formed as a result of the reaction. The temperature of the reaction may vary considerably from about 0° up to 75° C. or even higher. The reaction is rather fast in anhydrous solvents, in most cases, being slower in media containing water.

We claim:

1. Compounds of the group consisting of those having the general formula

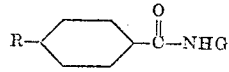

wherein R is a radical of the group consisting of amino, acetylamino, carbobenzoxyamino, hydroxyphenylazo, and nitro and —NHG is a polypeptide radical of glutamic acid, and the salts, esters, and amides thereof.

2. A method of preparing compounds having the general formula

in which —NHG is a polypeptide radical of glutamic acid, which comprises the steps of mixing together under reactive conditions a p-nitrobenzoyl halide and a polypeptide of glutamic acid.

3. p-Nitrobenzoyl-gamma-glutamyl glutamic acid having the formula

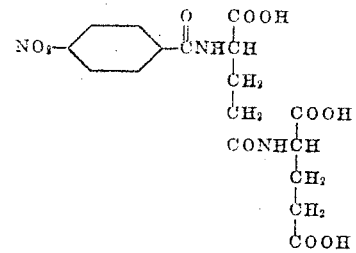

4. A method of preparing compounds having the general formula

in which —NHG is a tripeptide radical of glutamic acid, which comprises the steps of mixing together in a solvent p-nitrobenzoyl chloride and gamma-glutamyl-gamma-glutamyl glutamic acid and thereafter reducing the nitro group of the resulting product to an amino group.

JOHN H. MOWAT.
COY W. WALLER.

REFERENCES CITED

The following references are of record in the file of this patent:

UNITED STATES PATENTS

| Number | Name | Date |
| --- | --- | --- |
| 2,150,190 | Rossander et al. | Mar. 14, 1939 |

OTHER REFERENCES

Angier et al., Science, vol. 103, pp. 667 and 668 (May 1946).

Chem. Abs., vol. 22 (1928), p. 4097. Citing: Knoop et al., Z. Physiol. Chem., 170:186–211 (1927).

Stokstad et al., Annals of the N. Y. Acad. of Sci., vol. XLVIII, Art. 5 (Nov. 30, 1946), pp. 269 to 273.

Schmidt, "Chemistry of the Amino Acids and Proteins," Charles C. Thomas Co., Springfield, Ill. (1938), p. 265.

Abderhalden, in: Fermentforschung, vol 10 (1938), p. 219.